US010287891B2

(12) United States Patent
McKaveney et al.

(10) Patent No.: US 10,287,891 B2
(45) Date of Patent: May 14, 2019

(54) RADIAL LOCK FOR FAN BLADE SHEATH

(71) Applicant: UNITED TECHNOLOGIES CORPORATION, Farmington, CT (US)

(72) Inventors: Christopher S. McKaveney, Rocky Hill, CT (US); Jason Elliott, Huntington, IN (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 572 days.

(21) Appl. No.: 14/934,449

(22) Filed: Nov. 6, 2015

(65) Prior Publication Data

US 2016/0186573 A1 Jun. 30, 2016

Related U.S. Application Data

(60) Provisional application No. 62/097,177, filed on Dec. 29, 2014.

(51) Int. Cl.
*F01D 5/14* (2006.01)
*F01D 21/04* (2006.01)
(Continued)

(52) U.S. Cl.
CPC ............ *F01D 5/147* (2013.01); *F01D 5/02* (2013.01); *F01D 5/28* (2013.01); *F01D 5/3007* (2013.01);
(Continued)

(58) Field of Classification Search
None
See application file for complete search history.

(56) References Cited

U.S. PATENT DOCUMENTS 7,399,159 B2* 7/2008 Matheny ................. F01D 5/147
416/219 R
8,137,073 B2* 3/2012 Giusti ..................... F01D 5/147
416/224
(Continued)

FOREIGN PATENT DOCUMENTS

EP 2256296 A2 12/2010
EP 2604794 A1 6/2013
EP 2811144 A1 12/2014

OTHER PUBLICATIONS

European Search Report for Application No. 15202175.4-1610; dated Jun. 1, 2016.

*Primary Examiner* — Christopher Verdier
*Assistant Examiner* — Jason G Davis
(74) *Attorney, Agent, or Firm* — Cantor Colburn LLP

(57) ABSTRACT

A turbojet fan blade adapted for securement to an engine rotor includes a titanium sheath that extends continuously over its leading edge from blade tip to blade root. The sheath provides impact protection over the leading edge of the blade, and also incorporates enhanced radial securement of the sheath to the rotor. As such, a radial lock system for the sheath is disclosed that includes a fully integrated sheath portion that extends completely over the frontal face of a fan blade dovetail, providing a radial lock of the sheath to the rotor in the event of failure of any adhesive used to attach the sheath to the leading edge. Because the sheath extends continuously from blade tip to the blade root, lightning strike protection is enhanced by avoidance of any discontinuities otherwise associated with related art sheaths that typically extend over only a flow path portion of the leading edge.

14 Claims, 2 Drawing Sheets

(51) Int. Cl.
*F02K 3/06* (2006.01)
*F01D 5/02* (2006.01)
*F01D 5/32* (2006.01)
*F01D 5/28* (2006.01)
*F01D 5/30* (2006.01)

(52) U.S. Cl.
CPC ........... *F01D 5/326* (2013.01); *F01D 21/045* (2013.01); *F02K 3/06* (2013.01); *F05D 2220/32* (2013.01); *F05D 2220/36* (2013.01); *F05D 2230/20* (2013.01); *F05D 2240/303* (2013.01); *F05D 2240/80* (2013.01); *F05D 2260/30* (2013.01); *F05D 2300/173* (2013.01); *F05D 2300/174* (2013.01); *Y02T 50/671* (2013.01)

(56) References Cited

U.S. PATENT DOCUMENTS

| | | | |
|---|---|---|---|
| 9,429,026 B2* | 8/2016 | Schreiber | F01D 5/147 |
| 9,702,257 B2* | 7/2017 | Yagi | F01D 5/282 |
| 2014/0093367 A1 | 4/2014 | Parkin et al. | |

* cited by examiner

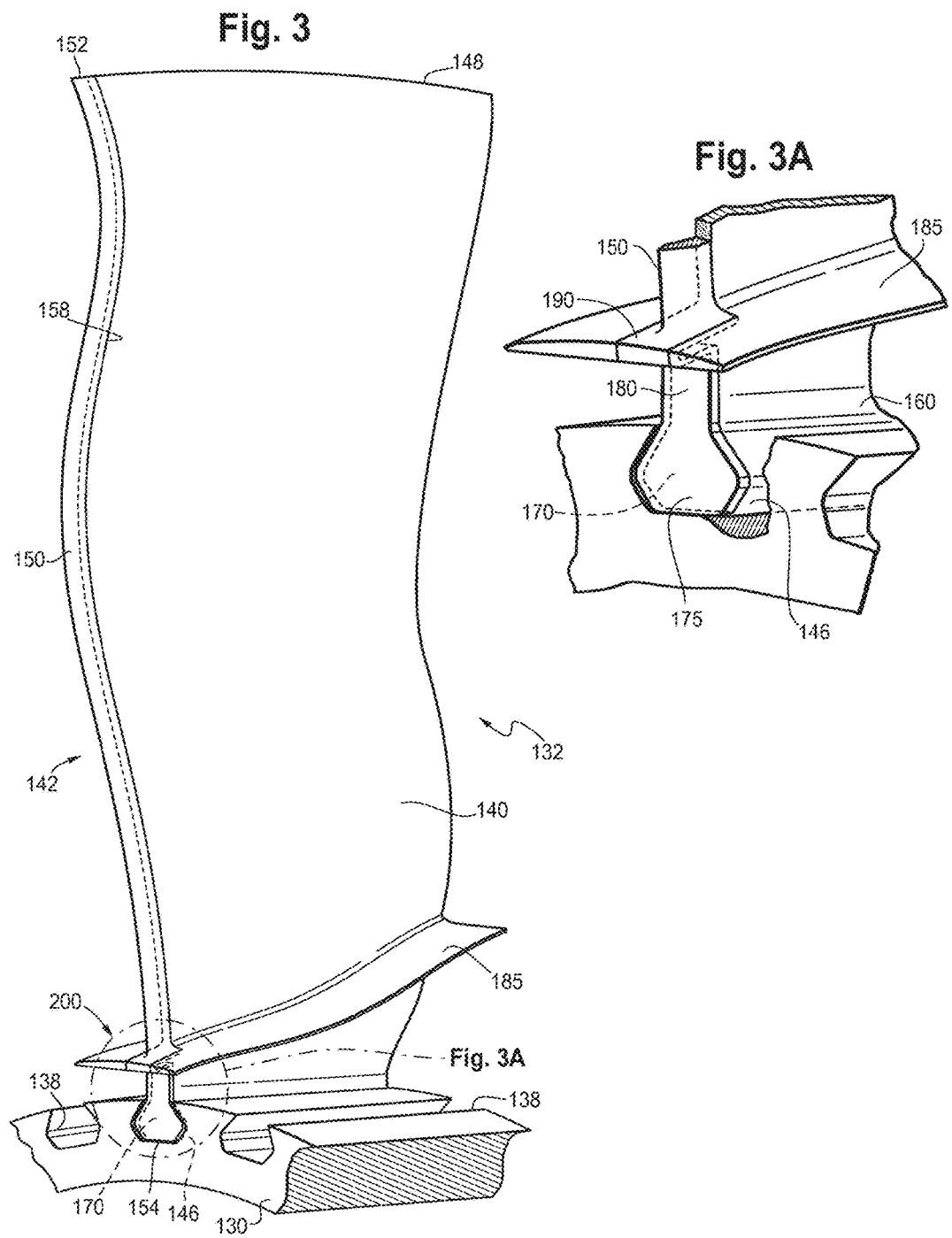

RADIAL LOCK FOR FAN BLADE SHEATH

CROSS REFERENCE TO RELATED APPLICATIONS

This application is a non-provisional application claiming the 35 U.S.C. § 119(e) benefit of U.S. Provisional Patent Application No. 62/097,177 filed on Dec. 29, 2014.

TECHNICAL FIELD

The present disclosure relates to impact protective sheaths adhesively applied to leading edges of bypass fan blades of modern turbofan jet engines, and particularly to a system for radially retaining such sheaths to a fan blade rotor in the event of an adhesive failure.

BACKGROUND OF THE DISCLOSURE

Fan blades of turbofan jet engines move high volumes of unheated, unexpanded atmospheric air circumferentially around a high pressure, heat expanded jet thrust that emanates centrally from a hot jet engine core. The air moved by the fan blades is termed "bypass" air, because such air is not mixed with fuel within the engine core to produce a primary engine thrust. The ratio of such bypass air to that of the primary engine thrust is called a bypass ratio. Those skilled in the art will appreciate advantages of utilizing bypass air, and that the fan blades are primarily designed for bypass ratio optimization with respect to any particular turbofan engine. Although such optimization is beyond the scope of this disclosure, it should be appreciated that optimization of an engine's particular bypass ratio is critical to minimizing fuel burn; i.e., the amount of fuel required for any given flight.

Fan blades constitute airfoils that are normally situated at the front end of a turbofan engine. As such, fan blades are subject to potential damage from deleterious impacts with foreign objects, including variable sized birds and geese, for example.

Approximately two-thirds of the outer portion of the leading edge of the fan blade is exposed to a so-called airfoil flow path. Since the fan blades is typically formed of an aluminum alloy base metal, the leading edge of the blade is covered with a hard metal sheath, most often via an adhesively applied layer of titanium metal. To minimize collision damage, the sheath normally directly covers only a structurally weaker, hence more vulnerable, outer portion of any given radial leading edge of the fan blade, typically because innermost radial portions of fan blades rotate at slower speeds and are thicker than their radially outer counterparts, hence less subject to collision damage.

Lightning strikes can pose a different type of hazard for aircraft structures. Damage risks due to such strikes must also be properly managed. Because the aluminum exterior of the fan blade is often coated to counter the effects of erosion, the aluminum body of the blade does not conduct electricity as well as the titanium sheath. Thus, providing a continuous path for lightning strikes has required the use of additional titanium strips and/or other structures to carry the energy of a lightning strike along a path of least resistance, e.g. the titanium, radially inwardly from the leading edge tip of the fan blade to a titanium rotor and/or titanium shaft, where it may be readily dissipated.

Finally, to the extent that the roots of the fan blades are most often secured to a rotor by means of dovetail portions adapted to extend axially within slots of the rotor, a system of reinforcing and/or strengthening turbojet fan blades is desirable, particularly from a standpoint of mitigating stresses and reducing potential metal fatigue issues in areas of associated fan blade air flow control platforms and/or in reduced thickness neck areas situated just radially outwardly of dovetail attachment root portions of the fan blade body.

In the related art, such structures have endured discontinuity issues and/or have had complex construction requirements. Thus, general fan blade strength improvements would be welcome in fan blade art for assuring simpler, yet more robust and dependable, structures along with improved lightning strike flow paths from fan blade tip to engine rotor.

SUMMARY OF THE DISCLOSURE

In accordance with one aspect of the disclosure, a turbojet engine fan blade is configured to be secured to a rotor, the fan blade having a radially inner extremity and a radially outer extremity. The fan blade includes a blade root defining the radially inner extremity, and a blade tip defining the radially outer extremity. A leading edge extends radially between the extremities, and a sheath extends continuously over the leading edge from the blade root to the blade tip.

In accordance with a further aspect of the disclosure, the turbojet engine fan blade is formed of an aluminum alloy metal, the sheath is formed of a titanium alloy metal, and the sheath is adhesively applied.

In accordance with another aspect of the disclosure, the blade root is defined by a dovetail configured for connection to the rotor. The blade includes a neck positioned radially above the dovetail, and the neck has a reduced thickness relative to that of the dovetail.

In an additional and/or alternative embodiment of any of the foregoing embodiments, the rotor includes an axially oriented slot for receiving the dovetail for radial securement of the fan blade to the rotor. The dovetail has a radially oriented face, and the sheath extends over, and is adhesively applied to, the face.

In an additional and/or alternative embodiment of any of the foregoing embodiments, a radial locking system for a turbojet fan blade sheath configured to adhesively cover a radially extending leading edge of a fan blade for impact protection of the blade, includes a fan blade, a sheath, and a rotor having a slot. The fan blade includes a root that engages the slot to secure the fan blade against radial forces. The root is adhesively covered by a portion of the sheath configured to radially interlock with the rotor upon an adhesive failure.

In an additional and/or alternative embodiment of any of the foregoing embodiments, a method of making a fan blade for a turbojet engine rotor includes steps of a) providing a turbojet engine rotor, b) providing an individual airfoil blade having a tip, a root, and a leading edge, the airfoil blade root being adapted to be secured to the rotor, and c) applying a sheath to the leading edge of the airfoil blade so that the sheath extends continuously along the length of the leading edge of the airfoil blade from the tip to the root.

These and other aspects and features of the present disclosure will be better understood in light of the following detailed description when read in light of the accompanying drawings.

BRIEF DESCRIPTION OF THE DRAWINGS

FIG. 3 is a perspective view of a fan blade and associated rotor (shown only fragmentarily) constructed in accordance with this disclosure.

FIG. 3a is an enlarged perspective view of structures related to the fan blade root of this disclosure.

DETAILED DESCRIPTION

Figure 1:
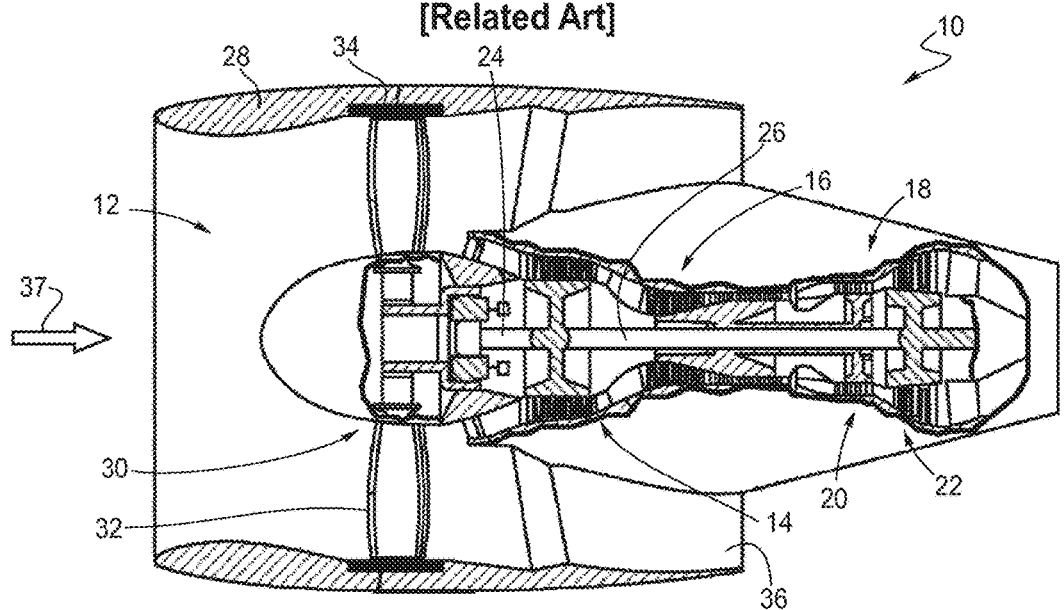
FIG. 1 is a schematic view of a related art bypass turbofan jet engine.

Referring now to the drawings, and with initial reference to FIG. 1, a turbofan jet engine 10 is depicted schematically. The engine 10 includes a fan section 12 situated forwardly of first and second compressor sections 14, 16, respectively. Fuel is introduced into the compressed air in a combustor section 18. The combustor section 18 is positioned forwardly of a high pressure turbine section 20, which in turn is situated forwardly of a low pressure turbine section 22. The fan section 12 is connected to a low-pressure shaft 24, while the high pressure turbine section 20 is connected to a high-pressure shaft 26.

The fan section 12 includes a nacelle 28 adapted to funnel airflow directly into the fan blades 32 secured to a rotor 30 coupled to the low-pressure shaft 24. Radially outwardly of the rotor 30 and the blades 32 is a containment ring 34 adapted to contain fragments of broken fan blades. Such fragmentation may, for example, occur pursuant to a catastrophic fan blade failure, such as a breakage of an outer tip portion of the blade, or even a complete separation of the blade from the rotor 30.

Those skilled in the art will recognize that the turbofan jet engine 10 is a twin spool bypass jet engine that includes an air bypass section 36 configured to move high volumes of unheated, unexpanded atmospheric air circumferentially about heat expanded combustion exhaust air that emanates from a centrally positioned jet engine core containing turbine sections 20, 22.

Atmospheric air, indicated by arrow 37, is pulled into the nacelle 28 by a plurality of fan blades 32, each of which is secured to the spinning rotor 30. A portion of the air 37 is directed to the compressor section 14, while the remainder is directed into the bypass section 36 without contribution to the fuel burning process that occurs within the combustor section 18.

The portion of atmospheric air 37 directed into the first compressor section 14 is further compressed by the second compressor section 16. Jet fuel is introduced into and ignited in the combustor section 18, and turbine rotors (not shown) within the high pressure turbine section 20 utilize energy from the spent fuel combustion products to rotate the high pressure shaft 26. Thus, those skilled in the art will appreciate that turbojet engine thrust is generated by a combination of the force of air passing through the bypass section 36 and the force of exhaust gases exiting from the turbine section 22.

Because they are designed to pull enormous quantities of atmospheric air 37 into the nacelle 28 to generate thrust, the fan blades 32 are vulnerable to foreign object damage (FOD), including bird impact damage, along with erosion caused by various atmospheric elements including rain, hail, and even dirt and sand particles.

Figure 2:
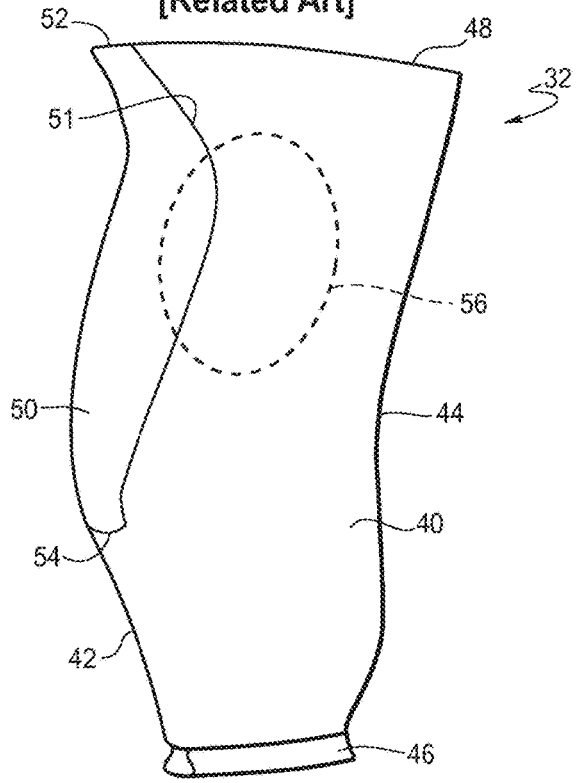
FIG. 2 is a side view of a portion of an engine rotor of the type employed in the turbofan jet engine of FIG. 1.

Referring now to FIG. 2, an exemplary related art fan blade 32 of the turbofan engine 10 is depicted. The blade 32 incorporates an aluminum alloy body 40 and, as an airfoil adapted to effectively move air, has a leading edge 42 and trailing edge 44. Radial extremities of the fan blade 32 are defined by a dovetail-shaped root 46 and a tip 48. A titanium sheath 50 extends over the portion of the leading edge 42 within the airfoil flow path for shielding the aluminum alloy body 40 of the blade 32 against FOD from, for example, bird strikes and erosion. The upper extremity 52 of the sheath 50 coincides with the upper extremity of 48 of the leading edge 42, while the bottom extremity 54 of the sheath 50 is situated above the root 46 of the blade 40.

The physical position of the titanium sheath 50, along the radial leading edge 42 of the fan blade 32, is designed to protect a region 56 (depicted as an oval dotted line) having decreased blade thickness. The region 56 is considered particularly vulnerable to potential breakage based on a combination of its low relative thickness and its high relative rotational speed. In the embodiment shown, the titanium sheath 50 includes side flanks 51 that are adhesively applied to a portion of the physical sides of the fan blade 32 for enhanced protection of the region 56.

Although the portion of the leading edge below the bottom extremity 54 of the sheath 50 is relatively thicker than the sheath-protected portion, and rotates more slowly, the bare aluminum alloy of that portion of the leading edge 42 is exposed to atmospheric elements that may lead to cracks and erosion. Moreover, in the event of lightning strikes, the bottom extremity 54 of the adhesively applied titanium sheath 50 can create a site of potential interface and/or region of discontinuity with respect to favorable dissipation of lightning energy.

Referring now to FIG. 3, a fan blade 132 incorporates a titanium and/or nickel alloy metal sheath 150 constructed in accordance with the present disclosure. The aluminum alloy body 140 of the fan blade 132 is secured to a titanium rotor 130 via a dovetail-shaped blade root 146, also herein referred to as a dovetail. For this purpose, the titanium rotor 130 includes axially oriented slots 138 configured to retain dovetails 146 of a plurality of blades 132 (only one shown) that are secured to and circumferentially spaced about the rotor 130.

The titanium and/or nickel metal sheath 150 is applied to the leading edge 142 of the fan blade 132 by an adhesive 158, such as an epoxy resin and/or other adhesives known in the art. In the described embodiment, the sheath 150 may have a thickness of approximately 0.125 inch, for example. The sheath 150 has an upper extremity 152 that coincides with the blade tip 148. The sheath 150 extends fully and continuously along the leading edge 142, down to the bottom extremity 154 of the dovetail 146. Although not included in the embodiment presented, the sheath 150 may also include side flanks (not shown) which extend partially about the sides of the fan blade 132, if and/or as desired. Since the sheath 150 extends continuously over the leading edge 142, there is no unprotected portion of the leading edge 142. Moreover there is no discontinuity for creating energy path issues in the event of lightning strikes.

Within the context of the above description, it will be appreciated by those skilled in the art that the adhesively applied sheath 150 is configured to extend continuously along the leading edge 142. For purposes of this disclosure, the leading edge 142 is herein defined to extend entirely between the upper extremity 152 to the bottom extremity 154.

Referring now also to FIG. 3a, the blade includes a neck 160 positioned just radially above the dovetail 146. To the extent that the neck 160 has a relative thickness that is less than that of the dovetail, it can be an area of potentially greater stress, creating some potential for metal fatigue failure. To the extent that the titanium sheath 150 has a portion 180 that overlies the neck 160, and is adhesively attached thereto, the sheath 150 imparts reinforcement or strength to the neck 160 to mitigate the risk of fatigue failure.

Although not present on all fan blades, the particular embodiment of the fan blade 132 shown and described in FIGS. 3 and 3a includes an air control platform 185 configured to optimize airflow passage over the blade 132. The winged shape of the platform as situated immediately above the neck may also present potential fatigue issues due to stress within fillet portions of the platform 185; i.e. along interface portions of the platform 185 within the aluminum alloy body 140 of the blade 132. A portion 190 of the sheath 150 radially overlies an axially protruding end 192 of the platform 185 to provide reinforcement to the end 192 to mitigate risk of fatigue failures that could otherwise originate in the latter interface portions.

Referring now specifically to FIG. 3a, it may be further appreciated that a radial locking system is provided to secure the sheath 150 to the rotor 130. For this purpose, a portion 175 of the sheath 150 overlies a radially oriented face 170 of the dovetail 146. Because the portion 175 is adhesively secured to the dovetail 146, the portion 175 acts as a lock to radially secure the sheath to the rotor 130 in the event of a failure of the adhesive 158. Thus, an interlocking aspect of the sheath portion 175 within the slot 138 of the rotor 130 provides a radial locking system 200, a feature defined in part by specific components of the slot 138 and the adhesively attached sheath portion 175, depicted as an inset circle in FIG. 3.

Finally, a method of making a fan blade for a turbojet engine rotor may include steps of a) providing a turbojet engine rotor; b) providing an individual airfoil blade having a tip, a root, and a leading edge, the airfoil blade root being adapted to be secured to the rotor; and c) applying a sheath to the leading edge of the airfoil blade so that the sheath extends continuously along the length of the leading edge of the airfoil blade from the tip to the root.

Although only a single embodiment is specifically described herein, this disclosure will by operation of law address the manufacture, use, and sale of alternative fan blade constructions that fall within spirit and scope of the appended claims.

INDUSTRIAL APPLICABILITY

From the foregoing, it may be appreciated that the disclosed radial lock for adhesively applied fan blade sheaths may have industrial applicability in a variety of settings such as, but not limited to, use in a turbofan jet engine environment. Such disclosed structures may also be used, for example, in industrial or marine machines for generating thrust, or in mining applications for generating power.

Those skilled in the art may appreciate additional advantages beyond those mentioned in the above disclosure. For example, one aspect is the provision of impact and erosion protection of an exposed, or otherwise bare, aluminum alloy surfaces of leading edge portions adjacent the blade root. Because the sheath is extends continuously over the leading edge, it also covers the noted neck and platform areas normally associated with potential fatigue failures. Such failures, typically associated with increased stress of vulnerable areas of aluminum alloy structures, are mitigated by the adhesively applied titanium sheath.

In addition, the aspect of having the leading edge sheath adhesively applied fully over the face of the dovetail provides physical reinforcement of the root. This could permit the use of smaller roots, so that additional blades could theoretically be added to a rotor of a given diameter to generate greater thrust.

Finally, the ability to decrease actual sizes of blade roots, i.e. the dovetail portions of fan blades that physically secure the blades to the rotor, could alternatively permit reductions in part sizes to reduce overall structural weight, as and/or if desired.

While the foregoing detailed description has addressed a specific embodiment, it is to be understood that the scope of the disclosure is not intended to be limiting. Thus, the breadth and spirit of this disclosure is intended to be broader than the embodiment specifically disclosed and covered by the claims appended hereto.

What is claimed is:

1. A turbojet engine fan blade configured to be secured to a rotor, the fan blade having a radially inner extremity and a radially outer extremity, the fan blade comprising:
    a blade root defining the radially inner extremity, and a blade tip defining the radially outer extremity;
    a platform located between the blade root and a body of the blade, the platform having an axially protruding end;
    a leading edge extending radially between the extremities, wherein the axially protruding end of the platform is aligned with and extends axially from the leading edge; and
    a sheath extending continuously over the leading edge and the axially protruding end from the blade root to the blade tip, wherein the sheath is in direct contact with a radially outer surface of the platform.

2. The turbojet engine fan blade of claim 1, wherein the fan blade comprises an aluminum alloy metal, and the sheath comprises a titanium alloy metal adhesively applied thereto.

3. The turbojet engine fan blade of claim 1, wherein the blade root comprises a dovetail, and wherein the blade includes a neck positioned radially above the dovetail, the neck having a reduced thickness relative to that of the dovetail.

4. The turbojet engine fan blade of claim 3, wherein a portion of the sheath overlies the neck.

5. The turbojet engine fan blade of claim 1, wherein the sheath grounds the blade from tip to the dovetail.

6. In combination a fan blade and rotor, the fan blade comprising:
    a blade root defining a radially inner extremity of the fan blade, and a blade tip defining a radially outer extremity of the fan blade;
    a platform located between the blade root and a body of the blade, the platform having an axially protruding end;
    a leading edge extending between the radial inner extremity and the radial outer extremity, wherein the axially protruding end of the platform is aligned with and extends axially from the leading edge; and
    a sheath extending continuously over the leading edge and the axially protruding end from the blade root to the blade tip, wherein the sheath is in direct contact with a radially outer surface of the platform; and
    wherein the rotor has a slot, and the fan blade root engages the slot when the fan blade is secured to the rotor.

7. The combination of claim 6, wherein the fan blade comprises an aluminum alloy metal, and the sheath comprises a titanium alloy metal.

8. The combination of claim 6, wherein the blade root comprises a dovetail, and wherein the blade includes a neck positioned radially above the dovetail, the neck having a reduced thickness relative to that of the dovetail.

9. The combination of claim 8, wherein the rotor includes an axially oriented slot that receives the dovetail when the fan blade is secured to the rotor, wherein the dovetail has a radially oriented face, and the sheath extends over and is adhesively applied to the face, the face being situated radially inwardly of the slot when the fan blade is secured to the rotor.

10. The combination of claim 9, wherein a portion of the sheath is adhesively applied to the face and the portion radially secures the sheath to the rotor.

11. The combination of claim 8, wherein a portion of the sheath overlies the neck.

12. The combination of claim 6, wherein the sheath grounds the blade tip to the blade root.

13. A method of reinforcing a fan blade for a turbojet engine rotor, the method comprising the steps of:
applying a sheath to a leading edge of the fan blade so that the sheath extends continuously along the length of the leading edge of the fan blade from a tip to a root of the fan blade, wherein the fan blade has a platform located between the root and a body of the fan blade, the platform having an axially protruding end covered by the sheath, wherein the axially protruding end of the platform is aligned with and extends axially from the leading edge, and wherein the sheath is in direct contact with a radially outer surface of the platform.

14. The method of claim 13, wherein the body is formed of an aluminum alloy, and wherein the sheath is formed of a titanium alloy adhesively applied to the leading edge of the fan blade.

* * * * *